(12) United States Patent
Tingler et al.

(10) Patent No.: US 10,839,172 B2
(45) Date of Patent: *Nov. 17, 2020

(54) METHODS AND SYSTEMS FOR AN ELECTRONIC SHELF LABEL SYSTEM

(71) Applicant: Walmart Apollo, LLC, Bentonville, AR (US)

(72) Inventors: Jeremy Tingler, Bentonville, AR (US); Nicholaus Adam Jones, Fayetteville, AR (US); Alvin Scott Taulbee, Springdale, AR (US); Thomas E. Stiefel, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,884

(22) Filed: Jun. 3, 2019

(65) Prior Publication Data

US 2019/0286860 A1 Sep. 19, 2019

Related U.S. Application Data

(63) Continuation of application No. 16/003,286, filed on Jun. 8, 2018, now Pat. No. 10,311,258.

(60) Provisional application No. 62/517,013, filed on Jun. 8, 2017.

(51) Int. Cl.
| | |
|---|---|
| *G06K 7/10* | (2006.01) |
| *G09F 3/00* | (2006.01) |
| *G09F 3/20* | (2006.01) |
| *H04W 88/08* | (2009.01) |
| *H04W 84/12* | (2009.01) |
| *G06K 15/06* | (2006.01) |

(52) U.S. Cl.
CPC ......... *G06K 7/10198* (2013.01); *G09F 3/00* (2013.01); *G06K 15/06* (2013.01); *G09F 3/208* (2013.01); *H04W 84/12* (2013.01); *H04W 88/08* (2013.01)

(58) Field of Classification Search
CPC ......... G06K 15/06; G06K 15/20; G06K 7/01; G05B 23/02; H04W 52/02
USPC ................ 340/10.1–10.5; 235/375, 383, 492
See application file for complete search history.

(56) References Cited

U.S. PATENT DOCUMENTS

| | | | | |
|---|---|---|---|---|
| 5,565,858 A | * | 10/1996 | Guthrie | G01S 19/09 340/10.33 |
| 6,419,154 B1 | | 7/2002 | Dalton et al. | |
| 8,698,606 B2 | | 4/2014 | Choi et al. | |
| 8,723,650 B2 | | 5/2014 | Tseng et al. | |
| 8,947,210 B2 | * | 2/2015 | Kim | G06K 7/10336 340/10.1 |
| 9,220,059 B2 | * | 12/2015 | Lee | H04W 52/0212 |
| 9,454,919 B2 | * | 9/2016 | Park | G09F 3/208 |
| 9,652,709 B2 | * | 5/2017 | Downie | G06K 19/0717 |
| 10,121,032 B2 | | 11/2018 | Sequeira et al. | |
| 10,311,258 B2 | * | 6/2019 | Tingler | G06K 7/10198 |
| 2005/0218218 A1 | | 10/2005 | Koster | |

(Continued)

FOREIGN PATENT DOCUMENTS

WO 2010/137883 A2 12/2010

OTHER PUBLICATIONS

International Search Report and Written Opinion for Application No. PCT/US2018/036626, dated Sep. 11, 2018. 8 pages.

*Primary Examiner* — Nam V Nguyen
(74) *Attorney, Agent, or Firm* — McCarter & English, LLP

(57) ABSTRACT

An electronic shelf label system comprising a plurality of electronic shelf labels is provided.

20 Claims, 5 Drawing Sheets

(56) References Cited

U.S. PATENT DOCUMENTS

| | | |
|---|---|---|
| 2006/0163349 A1 | 7/2006 | Neugebauer |
| 2007/0159298 A1 | 7/2007 | Zegelin et al. |
| 2007/0181678 A1 | 8/2007 | Nilsson et al. |
| 2009/0243873 A1* | 10/2009 | Mizukawa ............... G06F 3/147 340/4.32 |
| 2010/0253472 A1 | 10/2010 | Hashiguchi et al. |
| 2011/0025461 A1 | 2/2011 | Nobutsugu et al. |
| 2011/0128123 A1 | 6/2011 | Nilsson et al. |
| 2011/0193679 A1 | 8/2011 | Okabe et al. |
| 2012/0044056 A1* | 2/2012 | Byun ..................... G06F 3/147 340/10.1 |
| 2014/0177604 A1 | 6/2014 | Lee et al. |
| 2014/0316901 A1 | 10/2014 | Grabovski et al. |
| 2015/0169907 A1 | 6/2015 | Chang et al. |
| 2015/0199942 A1 | 7/2015 | Mochizuki |
| 2018/0121778 A1 | 5/2018 | Jung et al. |

* cited by examiner

METHODS AND SYSTEMS FOR AN ELECTRONIC SHELF LABEL SYSTEM

CROSS-REFERENCE TO RELATED PATENT APPLICATIONS

This application is a continuation of U.S. Non-Provisional application Ser. No. 16/003,286, filed on Jun. 8, 2018, issued as U.S. Pat. No. 10,311,258, and claims priority to U.S. Provisional Application No. 62/517,013, filed on Jun. 8, 2017, the content of which is hereby incorporated by reference in its entirety.

BACKGROUND

Electronic labelling systems are known in which electronic labels can be placed on shelves to display information associated with objects placed on the shelves.

BRIEF DESCRIPTION OF THE DRAWINGS

To assist those of skill in the art in making and using exemplary embodiments of the present disclosure, reference is made to the accompanying figures. The accompanying figures, which are incorporated in and constitute a part of this specification, illustrate one or more embodiments of the present disclosure and, together with the description, help to explain the present disclosure. Illustrative embodiments are shown by way of example in the accompanying drawings and should not be considered as limiting. In the figures.

DETAILED DESCRIPTION OF EMBODIMENTS

Figure 1:
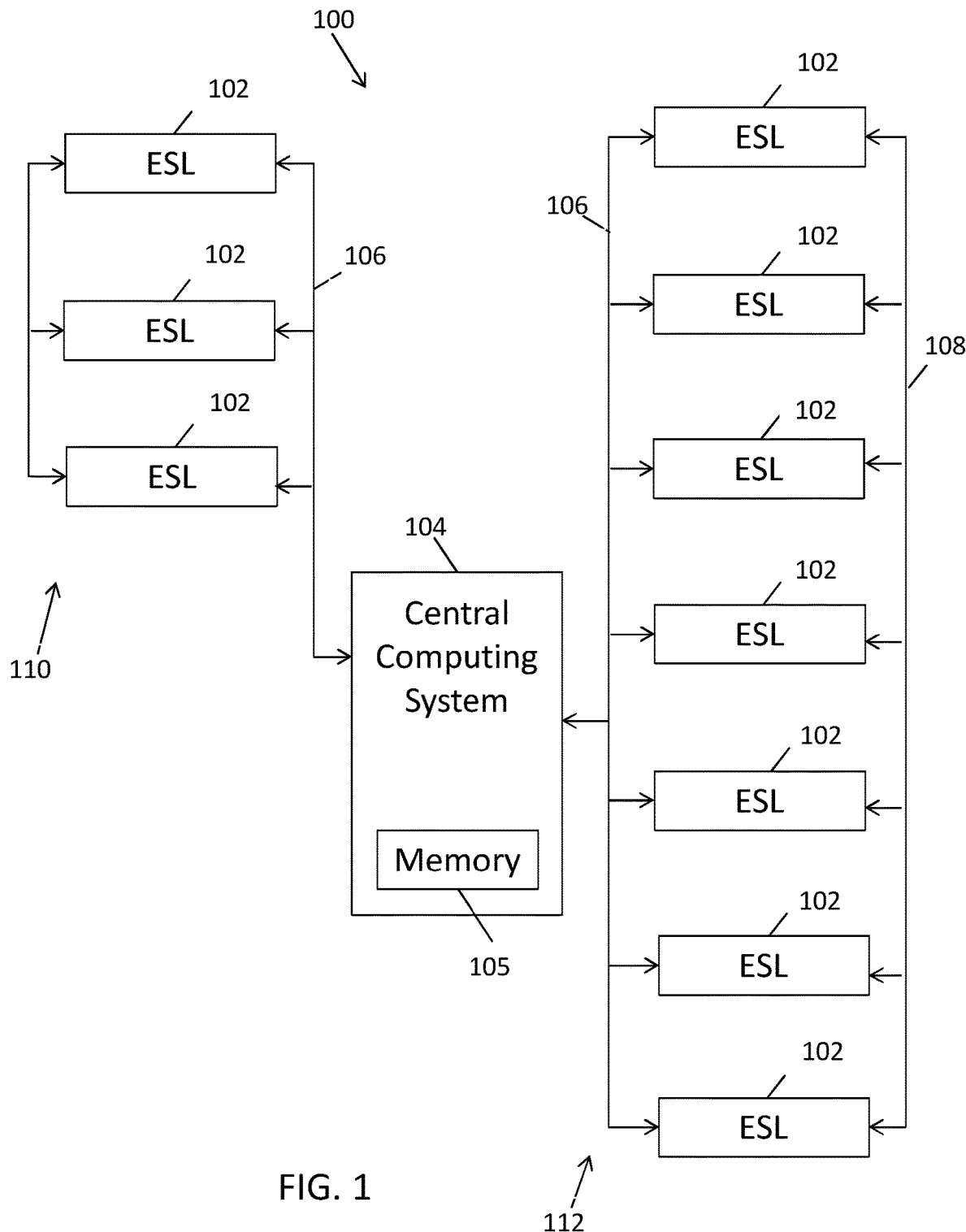
FIG. 1 illustrates an exemplary network environment for an electronic shelf label system, according to an exemplary embodiment.

Described in detail herein are methods and systems for an electronic shelf label system. The electronic shelf label system includes a plurality of electronic shelf labels within a building. Each electronic shelf label can include a processor and one or more radiofrequency communication modules configured to transmit data at different power levels to control a range of communication of the one or more radiofrequency communication modules. The electronic shelf label system further includes a central computing system configured to transmit data via one or more wireless (e.g., Wi-Fi) access points to the plurality of electronic shelf labels at a first power level.

The plurality of electronic shelf labels is configured to periodically activate from a sleep mode to identify whether there is an existing master electronic shelf label from the plurality of electronic shelf labels via a transmission by the one or more communication modules at a second power level. In response to an activated electronic shelf label failing to identify an existing master electronic shelf label based on the transmission at the second power level, the activated electronic shelf label, as a candidate electronic shelf label, determines, based on a first set of specified conditions associated with the candidate electronic shelf label, whether to become a new master electronic shelf label. A master electronic shelf label can transmit programming instructions received from the central computing system to the one or more electronic shelf labels at the second power level or can transmit status data received from the one or more electronic shelf labels to the central computing system via the one more Wi-Fi access points at the first power level.

Conversely, in response to identifying the existing master electronic shelf label, the candidate electronic shelf label determines, based on a second set of specified conditions associated with the existing master electronic shelf label, whether to become another master electronic shelf label to transmit the programming instructions received from the central computing system to the one or more electronic shelf labels at the second power level or to transmit status data received from the one or more electronic shelf labels to the central computing system via the one more Wi-Fi access points at the first power level.

In response to the candidate electronic shelf label becoming the new master electronic shelf label, the candidate electronic shelf label is configured to store the programming instructions for the one or more electronic shelf labels received from the central computing system. The programming instructions include unique identifiers to associate the programming instructions with corresponding electronic shelf labels of the one or more electronic shelf labels. The candidate electronic shelf label transmits the programming instructions to the corresponding electronic shelf labels of the one or more electronic shelf labels.

The electronic shelf label system described herein reduces the number of electronic shelf labels connecting to the one or more Wi-Fi access points at any given time. Connecting a plurality of electronic shelf labels to a Wi-Fi access point, while theoretically possible, poses several problems, and is not feasible in practice for a number of reasons. For example, each Wi-Fi access point has limits on the number of connections and amount of network load it can handle. A speed rating of a Wi-Fi access point represents the maximum theoretical network bandwidth the Wi-Fi access point can support. For example, a Wi-Fi router rated at 300 Mbps with 200 electronic shelf labels connected can only offer on average 1.5 Mbps to each electronic shelf label. The performance of the Wi-Fi access point will degrade as more electronic shelf labels and/or other devices join the network and start using it simultaneously. There is also the possibility that the Wi-Fi access point stops working when operating at extreme loads for extended periods. In addition, having a large number of Wi-Fi connected electronic shelf labels concentrated in close physical proximity like a building generates significant wireless signal interference. Radio interference among Wi-Fi connected electronic shelf labels degrades network performance and eventually causes connection drops.

FIG. 1 illustrates an exemplary network environment for an electronic shelf label system 100 in accordance with embodiments of the present disclosure. The system 100 can include electronic shelf labels (ESLs) 102 disposed within a building and a central computing system 104. The central computing system 104 is in wireless communication 106 with the electronic shelf labels 102 via one or more wireless access points operating at a first power level. In an exemplary embodiment, the wireless communication 106 is Wi-Fi communication. The central computing system 104 includes a data storage 105 that holds programming instructions for one or more of the electronic shelf labels 102. Separate storage can be used. The programming instructions include data for controlling display of information on the one or more electronic shelf labels 102. This enables the central computing system 104 to control and/or update information displayed on the one or more electronic shelf labels 102.

The central computing system 104 transmits the programming instructions intended for the one or more electronic shelf labels 102. In an exemplary embodiment, the central computing system 104 transmits the programming instructions via one or more Wi-Fi access points to the plurality of electronic shelf labels 102, or to a defined group of electronic shelf labels 102, or to a single electronic shelf label (ESL) 102. Each electronic shelf label 102 is identified by a unique identifier for receiving programming instructions from the central computing system 104 and/or from other electronic shelf labels 102 in the system 100. In one embodiment, upon receiving the programming instructions, the receiving electronic shelf label 102 determines whether the programming instructions are intended for the receiving electronic shelf label by checking a unique identifier in the received programming instructions to determine whether the unique identifier in the received programming instructions matches the unique identifier of the electronic shelf label 102.

The electronic shelf labels 102 can wirelessly communicate 108 with each other at a second power level. In an exemplary embodiment, the wireless communication 108 uses at least one of low-level Wi-Fi, Bluetooth, or RFID capabilities. The second power level requires that the electronic shelf labels 102 be placed within communication distance of each other. The second power level is lower than the first power level to reduce the range of the radiofrequency transmissions between the electronic shelf labels such that each electronic shelf label can communicate with neighboring electronic shelf labels within range of the radiofrequency transmissions at the second power level, but cannot communicate with electronic shelf labels outside the range of the radiofrequency transmissions at the second power level. For example, FIG. 1 illustrates a subset 110 of electronic shelf labels 102 that are within communication range of each other and are not within communication range with another subset 112 of electronic shelf labels 102. Therefore, the two subsets 110, 112 cannot communicate at the second power level based on their relative locations.

Figure 2:
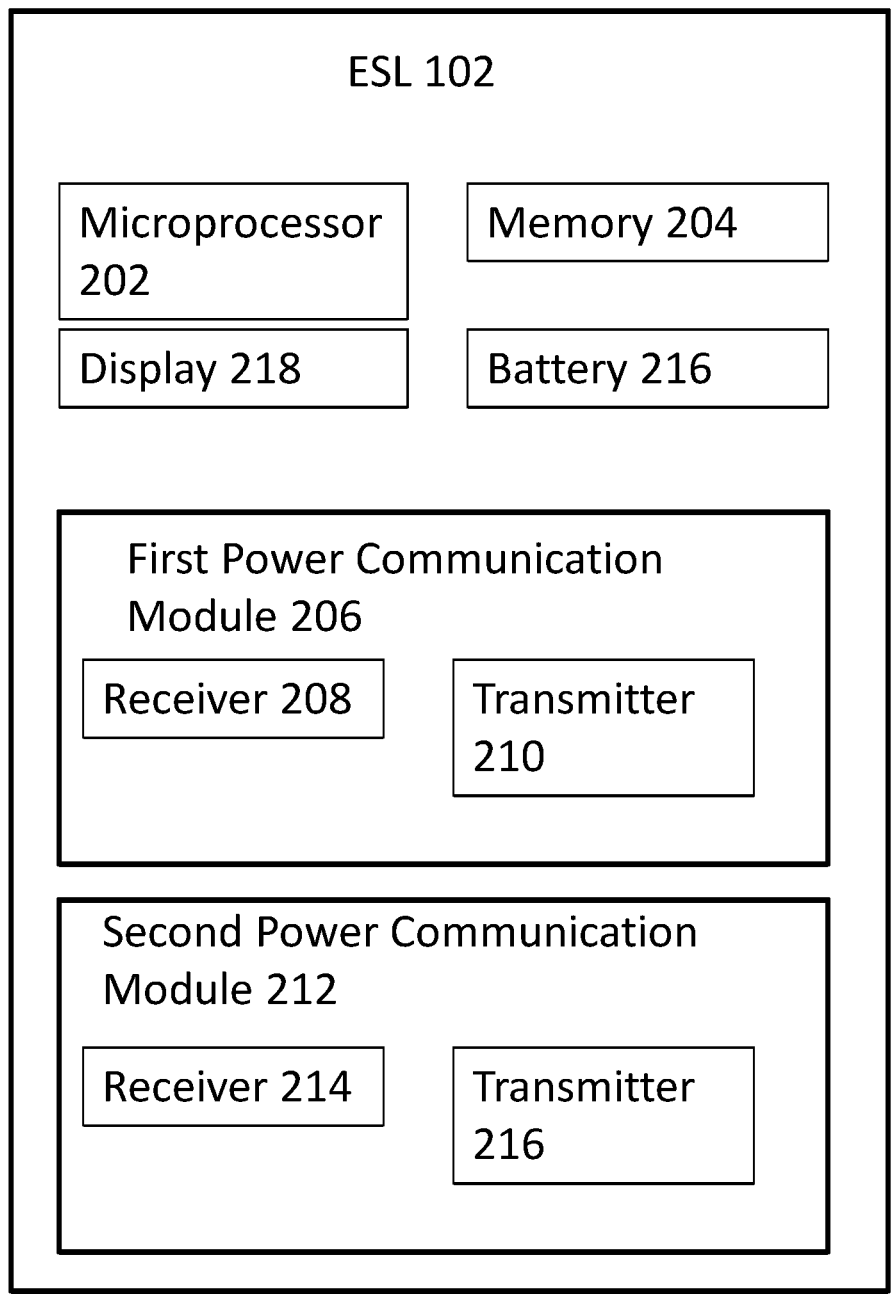
FIG. 2 is a schematic diagram of an exemplary electronic shelf label that can be utilized in the electronic shelf label system, according to an exemplary embodiment.

FIG. 2 is a schematic diagram of an exemplary electronic shelf label 102 used in system 100. The electronic shelf label 102 includes a microprocessor 202 communicatively coupled to a memory 204, a battery 216 to provide power to the electronic shelf label 102, a first power level (FPL) radiofrequency communication module 206, and a second power level (SPL) radiofrequency communication module 212. The FPL radiofrequency communication module 206 and the SPL radiofrequency communication module 212 are configured to transmit and receive data at different power levels to control a range of communication with the central computing system 104 and other electronic shelf labels 102, as described herein.

The FPL radiofrequency communication module 206 includes a receiver 208 configured to receive signals at a first power level via wireless communication 106 transmitted from the central computing system 104 via one or more wireless access points and convert the signals to electrical signals that can be read by the microprocessor 202. The FPL radiofrequency communication module 206 further includes a transmitter 210 configured to transmit signals at a first power level via wireless communication 106 through one or more wireless access points to the central computing system 104. In the example embodiment, the wireless communication 106 between an electronic shelf label and the wireless access point(s) uses a Wi-Fi communication protocol with the first power level. In some embodiments, the receiver 208 and transmitter 210 are combined into a transceiver unit.

The SPL radiofrequency communication module 212 includes a receiver 214 configured to receive signals at a second power level via wireless communication 108 transmitted from one or more of the electronic shelf labels 102. The receiver 214 can convert the signals to electrical signals that can be read by the microprocessor 202. The SPL radiofrequency communication module 212 further includes a transmitter 216 configured to transmit signals at a second power level via wireless communication 108. The SPL radiofrequency communication module 212 is configured to transmit data at the second power level using at least one of low level Wi-Fi, Bluetooth, low energy Bluetooth, near field communication (NFC), or RFID capabilities. In an exemplary embodiment, the transmitter 216 can be configured to transmit signals at the second power level through RFID connections to one or more electronic labels 102. In some embodiments, the receiver 214 and transmitter 216 are combined into a transceiver unit.

While the non-limiting example embodiment shown in FIG. 2 includes the first power level radiofrequency communication module 206 and the second power level communication module 212, exemplary embodiments of the electronic shelf labels can include a single communication module that is configured to selectively transmit data/information at the first power level and to selectively transmit data/information at the second power level. For example, in exemplary embodiments, a communication module of an electronic shelf label can be configured to selectively transmit data/information to the wireless access point(s) at the first power level and to selectively transmit data/information to other electronic shelf labels at the second power level. In some embodiments, the frequency at which the data/information is transmitted is identical for transmissions at the first and second power levels. In some embodiments, the frequency at which the data/information is transmitted is different for transmissions at the first and second power levels.

The electronic shelf label 102 can further include an electronic display 218 controlled by the microprocessor 202. For example, the display 218 may be a dot matrix display, a segment-based display, an LED display, an electronic ink (e-ink) display. In one embodiment, the electronic shelf label 102 includes a display driver, and the microprocessor 202 is arranged to control updates of the electronic display 218 by controlling the display driver. The electronic display 218 can display product information in different fields of the electronic display 218, such as one or more of a price per item of the product, a price per unit, a special offer, a number of items of the product in stock, an expected number of merchandise on a shelf, space management information, or an indicator field. The indicator field may be used, for example, to display a red light to indicate a discount. The fields may be arranged in different ways and/or used for displaying other types of information as desired. Normally, however, the price information is displayed.

The microprocessor 202 of the shelf label 102 is configured to receive programming instruction from the central computing system 104 or another one of the electronic shelf labels to configure the electronic shelf label 102 to display particular information on the electronic display 218, such as a new price for a product associated with the electronic shelf label 102. However, other kinds of product information may also be updated. More particularly, the microprocessor 202 is configured to process the received programming instructions and relate the instructions to images displayed on the electronic display 218.

The microprocessor 202 can operate in a sleep mode for a period of time, and can periodically transition to operate in an awake/active mode (activate from the sleep mode) to identify whether one of the electronic shelf labels 102 is an existing master electronic shelf label. The SPL communication module 212 can transmit a status request at the second power level to the electronic shelf labels 102 in its neighborhood (as defined by those electronic shelf labels within range of the transmission from the communication module 212 at the second power level). The SPL communication module 212 receives return transmissions from the plurality of electronic shelf labels 102. Each return transmission identifies a status of the responding electronic shelf label 102, including whether the responding electronic shelf label 102 is currently a master electronic shelf label. As further described in FIG. 3, the electronic shelf labels 102 can be configured to determine whether to become a master shelf label to transmit programming instructions received from the central computing system to one or more electronic shelf labels at the second power level or to transmit status data received from the one or more electronic shelf labels to the central computing system via the one more wireless access points at the first power level. When in active mode, the microprocessor 202 controls the communication channels, for example, by controlling when to send transmissions to other electronic shelf labels 102 and receiving data from the central computing system 104 including data for other electronic shelf labels. In this way, sufficient processor capacity is available when needed, for example, for information updates. At the same time, since the microprocessor 202 is only active and consuming power when it is needed (e.g., to discharge the duties of a master electronic shelf label), excess or unnecessary power consumption is minimized. After a predefined period of time or after its duties as a master electronic shelf label are satisfied, the microprocessor 202 returns to sleep mode and power consumption will be reduced.

Figure 3:
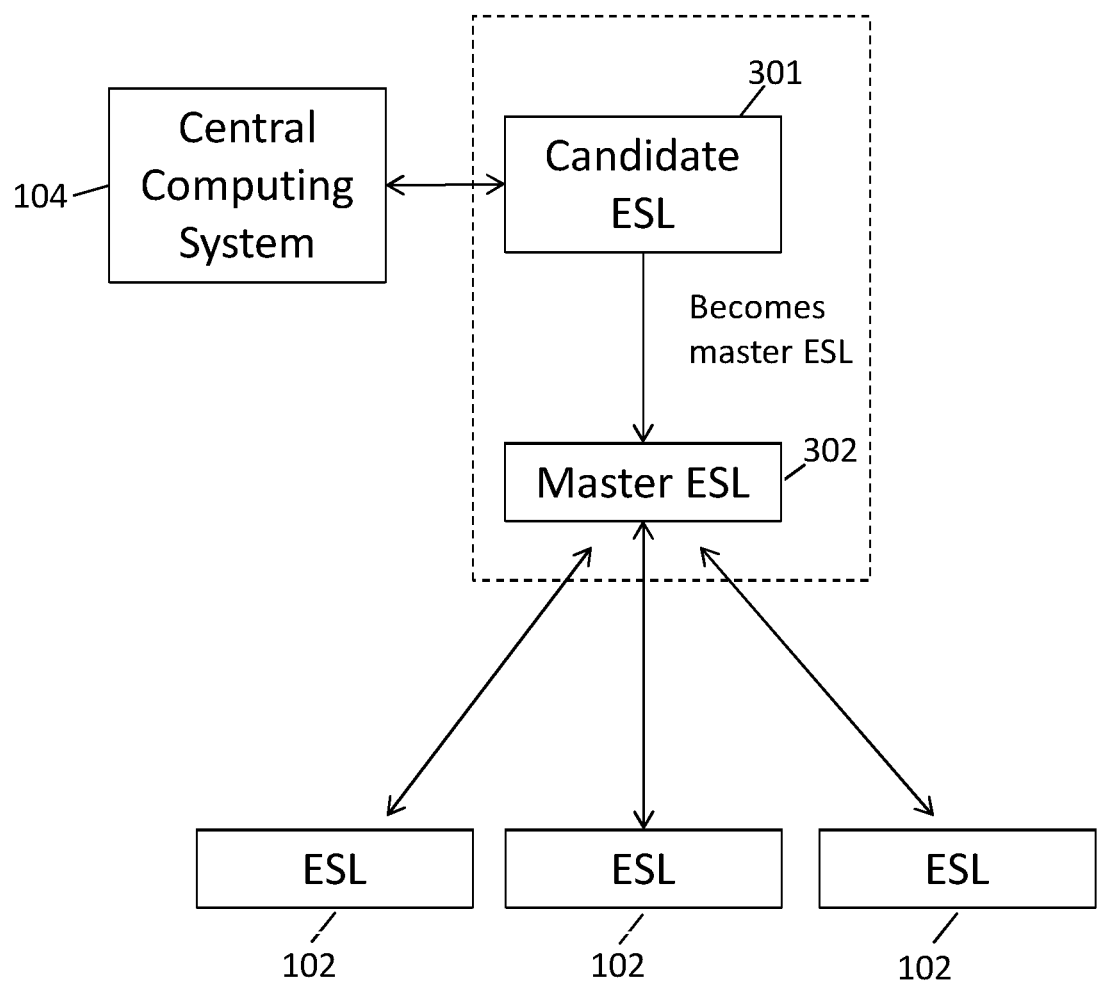
FIG. 3 illustrates communication between a central computing system and a plurality of electronic shelf labels using a master electronic shelf label in the electronic shelf label system, according to an exemplary embodiment.

FIG. 3 illustrates communication between the central computing system 104 and the electronic shelf labels 102 using a master electronic shelf label 302. The central computing system 104 is configured to transmit data transmissions via one or more wireless (Wi-Fi) access points to the electronic shelf labels 102 at a first power level, as displayed in FIG. 1. The central computing system 104 includes a data storage that holds information such as programming instructions for one or more of the labels 102. The central computing system 104 can broadcast the programming instructions via wireless access point(s) intended for the electronic shelf labels 102, or to a defined group of electronic shelf labels 102, or to a single electronic shelf label 102 (e.g., based on the identifiers in the programming instructions).

The programming instructions include commands for controlling the display of information on one or more electronic shelf labels 102 of the plurality of electronic shelf labels 102. For example, the programming instructions may be transmitted in a file, such as a mark-up language file (e.g., HTML or XML), a data packet having a header and payload data, or in any other suitable format that is readable by the one or more electronic shelf labels 102. Each programming instruction includes an identifier of an electronic shelf label intended to receive the programming instruction and information to be displayed on the intended electronic shelf label. The information can correspond to a product associated with the intended electronic shelf label. A template may be used to define a layout of information on the electronic shelf labels 102.

In an exemplary embodiment, a candidate electronic shelf label 301 periodically activates from a sleep mode to identify whether there is an existing master electronic shelf label 302 that is active and is within range of a transmission at the second power level. In an alternative embodiment, the data transmissions from the central computing system 104 primarily serve as a "wake-up" for the candidate electronic shelf label 301. The candidate electronic shelf label 301 can be any one of electronic shelf labels 102 that periodically activates and/or receives the data transmissions. The candidate electronic shelf label 301 communicates with the plurality of electronic shelf labels 102 via transmissions at the second power level to determine whether there are already one or more master electronic shelf labels 302 controlling communications to and from the central computing system 104.

In response to failing to identify an existing master electronic shelf label based on the transmissions at the second power level, the candidate electronic shelf label 301 determines, based on a first set of specified conditions associated with the candidate electronic shelf label 301, whether to become a new master electronic shelf label 302. The first set of specified conditions can include whether battery power for the candidate electronic shelf label 301 is above a threshold battery power such that the candidate electronic shelf label 301 can carry out the functions of the master electronic shelf label 302.

Conversely, in response to identifying an existing master electronic shelf label, the candidate electronic shelf label 301 determines, based on a second set of specified conditions associated with the existing master electronic shelf label, whether to become another master electronic shelf label 302. The second set of specified conditions includes conditions associated with the existing master electronic shelf label and the candidate label, and the specified conditions can include at least one of whether a received signal strength indicator level of the existing master electronic shelf label is above a threshold signal strength, whether a read rate of the existing master electronic shelf label is above a threshold read rate, or whether battery power for the candidate electronic shelf label is above the threshold battery power.

As described further below, the master electronic shelf label 302 is configured to receive and store programming instructions received from the central computing system 104 at a first power level and intended for one or more other electronic shelf labels 102. The programming instructions including unique identifiers to associate the programming instructions with corresponding electronic shelf labels 102 of the one or more electronic shelf labels 102. The master electronic shelf label 302 can include a list of one or more electronic shelf labels based on communications between the master electronic shelf label 302 and the one or more electronic shelf labels 102. For example, upon determining that the master electronic shelf label 302 exists, the one or more electronic shelf labels 102 can register with the master shelf label 302 to add their unique identifiers to the list maintained by the master electronic shelf label 302. When the master electronic shelf label 302 receives programming instructions intended from one or more of the electronic shelf labels that registered with the master electronic shelf label 302, the master electronic shelf label 302 stores the programming instructions. If a programming instruction does not corresponding to one of the unique identifiers in the list, the master electronic shelf label can discard the programming or can temporarily store the programming instructions for a period of time that exceeds a sleep time of the electronic shelf labels.

The master electronic shelf label 302 is further configured to transmit the programming instructions to the one or more electronic shelf labels 102 at the second power level when the one or more electronic shelf labels 102 are in the active mode. Conversely, the master electronic shelf label 302 is configured to transmit status data received from the one or more electronic shelf labels 102 to the central computing system 104 via the one or more wireless (Wi-Fi) access points at the first power level.

The first set and second set of specified conditions control a risk of failure or malfunction of the candidate electronic shelf label 301 should the candidate electronic shelf label 301 become the master electronic shelf label 302. For the system 100 to function satisfactorily, communication between the central computing system 104 and each electronic shelf label 102, and between the electronic shelf labels 102, must function at any given time, to ensure that information intended for a particular electronic shelf label 102 reaches that label. For example, the battery 216 has a limited lifetime. Also, there is a risk that transmissions from one or more electronic shelf labels 102 may experience interference by physical obstacles or other communications occurring in the area, thus preventing signals transmitted from the central computing system 104 or the master electronic shelf label 302 from reaching the electronic shelf label 102 for which it is intended.

The candidate electronic shelf label 301 can either determine to become a master electronic shelf label 302 based on the first set and/or the second set of specified conditions or decline to become the master electronic shelf label 302.

The Candidate Electronic Shelf Label Becomes the Master Electronic Shelf Label

Under a first example scenario, the candidate electronic shelf label 301 becomes the new master electronic shelf label 302 (e.g., if a master electronic shelf does not already exist or if the candidate electronic shelf label 301 determines to become an additional master shelf label based on the first set of specified conditions and/or the second set of specified conditions). The master electronic shelf label 302 is configured to store, in memory, the programming instructions for one or more electronic shelf labels 102 received from the central computing system 104. In exemplary embodiments, the master electronic shelf label 302 can determine which programming instructions to store and which to discard based on a list of the one or more electronic shelf neighbors that are within range of the master electronic shelf label. For example, the electronic shelf labels execute a registration process to determine which other electronic shelf labels are in their neighborhood. The electronic shelf labels can perform the registration process periodically to identify new electronic shelf labels in the neighborhood or to identify electronic shelf labels that have been removed from the neighborhood. The electronic shelf labels can maintain lists of the unique identifiers of each electronic shelf label that it determines to be in its neighborhood. The master electronic shelf label 302 can store the programming instructions intended for its neighbors based on the list of unique identifiers in its neighborhood and can discard programming instructions intended for electronic shelf labels that are not in its neighborhood.

After storing the programming instructions, the master electronic shelf label 302 can remain in the active mode and wait for transmissions from the one or more electronic shelf labels 102. For example, as each of the one or more electronic shelf labels 102 transitions from a sleep mode to an active mode, each of the one or more electronic shelf labels 102 transmit a request for programming instructions at the second power level. In response to receiving the request, the master electronic shelf label 302 transmits the programming instructions to the corresponding electronic shelf labels 102 of the one or more electronic shelf labels 102 at the second power level based on the unique identifiers associated with the programming instructions. The master electronic shelf label 302 can simultaneous communicate with a number of electronic shelf labels 102 located near each other, depending on the distance from the master electronic shelf label 302 to the electronic shelf labels 102.

As described herein, the programming instructions include unique identifiers to associate the programming instructions with the corresponding electronic shelf labels 102 of the one or more electronic shelf labels 102. The master electronic shelf label 302 can determine which electronic shelf labels 102 are to receive the programming instructions and transmit them only to these particular electronic shelf labels 102. For example, a specific group of electronic shelf labels 102 may receive programming instructions for a product price change. In some embodiments, the master electronic shelf label 302 can receive programming instructions for itself from the central computing system 104 and can update its display based on the received programming instructions.

The master electronic shelf label 302 is further configured to enter a sleep mode until it transmits the programming instructions to the one or more electronic shelf labels 102 and/or after remaining activated for a configurable amount of time, and thereby reverts back to a candidate electronic shelf label 301. As one example, the master electronic shelf label 302 can remain in the active mode until all of the stored programming instructions are transmitted. As another non-limiting example, the master electronic shelf label 302 may include a timer for measuring time passed since data was received from the central computing system 104 or for comparing the measured time to a predetermined threshold time for the master electronic shelf label 302 to deactivate. In response to the master electronic shelf label 302 determining to deactivate, the master electronic shelf label 302 transmits a broadcast message at the second power level to identify an electronic shelf label 102 of the one or more of the electronic shelf labels 102 to become a new master electronic shelf label. In response to the master electronic shelf label 302 identifying an electronic shelf label 102 of the one or more of the electronic shelf labels 102 to replace the master electronic shelf label 302 as the new master electronic shelf label, the master electronic shelf label 302 transmits any remaining programming instructions to the electronic shelf label 102 of the one or more of the electronic shelf labels 102 and deletes the programming instructions from the memory. The new master electronic shelf label then continues transmitting the remaining programming instructions to the electronic shelf label 102. An electronic shelf label 102 can determine whether to become a new master electronic shelf label based on the first and/or second set of specified conditions as described herein and/or based on whether the electronic shelf label 102 includes the unique identifiers in its list that correspond to the unique identifiers in the remaining programming instructions (e.g., to prevent a failure in the propagation of a programming instruction to an intended electronic shelf label).

The Candidate Electronic Shelf Label Declines to Become the Master Electronic Shelf Label Under a second example scenario, the candidate electronic shelf label 301 can decline to become a new master electronic shelf label or an additional master electronic shelf label based on the first set of specified conditions and/or the second set of specified conditions. If there are programming instructions for the candidate electronic shelf label 301, the candidate electronic shelf label 301 receives the programming instructions from an existing master electronic shelf label, receives the programming instructions from the central computing system via the wireless access point(s), or waits for an electronic shelf label 102 of the one or more electronic shelf labels 102 within range of the candidate electronic shelf label 301 transmitting at the second power level to become an existing master electronic shelf label.

Under one or both example scenarios, in one embodiment, the master electronic shelf label transmits a confirmation to the central computer 104 that the programming instructions have been successfully transmitted to the one or more electronic shelf labels 102. In such an embodiment, the central computer 104 may continually broadcast the programming instructions until feedback of the confirmation is received. This enables any master electronic shelf label to enter a sleep mode without needing to transfer the programming instructions to another master electronic shelf label.

Figure 4:
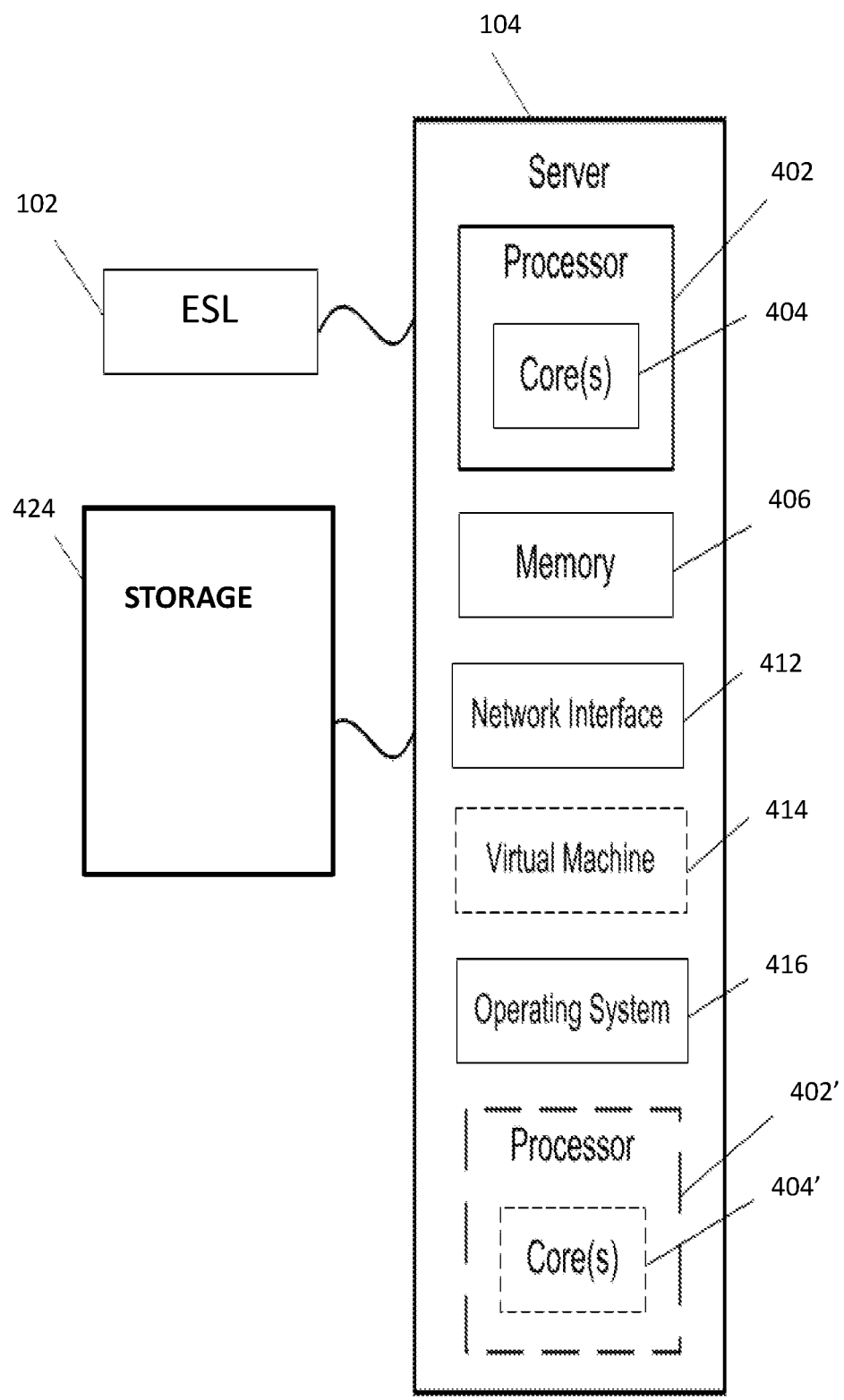
FIG. 4 is a schematic view of the central computing system, according to an exemplary embodiment.

FIG. 4 is a schematic view of the central computing system 104 according to an exemplary embodiment. The central computing system 104 includes one or more non-transitory computer-readable media for storing one or more computer-executable instructions or software for implementing exemplary embodiments. The non-transitory computer-readable media can include, but are not limited to, one or more varieties of hardware memory, non-transitory tangible media (for example, one or more magnetic storage disks, one or more optical disks, one or more USB flash drives), and the like. For example, a memory 406 included in the central computing system 104 can store computer-readable and computer-executable instructions or software for implementing exemplary embodiments. The central computing system 104 also includes a processor 402 and an associated core 404, and optionally, one or more additional processor(s) 402' and associated core(s) 404' (for example, in the case of computer systems having multiple processors/cores), for executing computer-readable and computer-executable instructions or software stored in memory 406 and other programs for controlling system hardware. Processor 402 and processor(s) 402' can each be a single core processor or multiple core (404 and 404') processor.

In some embodiments, the central computing system 104 may include a browser application and a browser cache. For example, the browser application can enable a user to enter programming instructions and product information.

Virtualization can be employed in the central computing system 104 so that infrastructure and resources in the computing device can be shared dynamically. A virtual machine 414 can be provided to handle a process running on multiple processors so that the process appears to be using only one computing resource rather than multiple computing resources. Multiple virtual machines can also be used with one processor.

Memory 406 can include a computer system memory or random access memory, such as DRAM, SRAM, EDO RAM, and the like. Memory 406 can include other varieties of memory as well, or combinations thereof. In some embodiments, a user can interact with central computing system 104 through a visual display device, such as a computer monitor, which can display one or more user interfaces that can be provided in accordance with exemplary embodiments. Visual display device may also display other aspects, elements and/or information or data associated with exemplary embodiments, such as product information. The central computing system 104 may include other I/O devices for receiving input from a user, for example, a keyboard, or any suitable multi-point touch interface, a pointing device (e.g., a pen, stylus, mouse, or trackpad). The keyboard and pointing device may be coupled to visual display device. The central computing system 104 may include other suitable conventional I/O peripherals.

The central computing system 104 can also include one or more storage devices 424, such as a hard-drive, CD-ROM, or other computer readable media, for storing data and computer-readable instructions and/or software that implements embodiments of the central computing system 104, as described herein, or portions thereof. In an exemplary embodiment, the storage device 424 includes data for configuring one or more electronic shelf labels 102. In one embodiment, information to be displayed on each electronic shelf label 102 is stored as a file, such as an XML file or data packets, where each file or data packet determines a layout of the information on the electronic shelf label 102. In some embodiment, the information, such as price changes and other updated information, is received by the central computing system 104 from, for example, a price database. Exemplary storage device 324 can also store one or more storage devices for storing any suitable information required to implement exemplary embodiments.

The central computing system 104 can include a network interface 412 configured to interface via one or more electronic shelf label 102 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or any other device suitable for interfacing the central computing system 104 to any variety of networks capable of communication and performing the operations described herein. Moreover, the central computing system 104 can be any computer system, such as a workstation, desktop computer, server, laptop, handheld computer, tablet computer, mobile computing or communication device, or other form of computing or telecommunications device that is capable of communication and that has sufficient processor power and memory capacity to perform the operations described herein.

The central computing system 104 can run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 416 can be run in native mode or emulated mode. In an exemplary embodiment, the operating system 416 can be run on one or more cloud machine instances.

Figure 5:
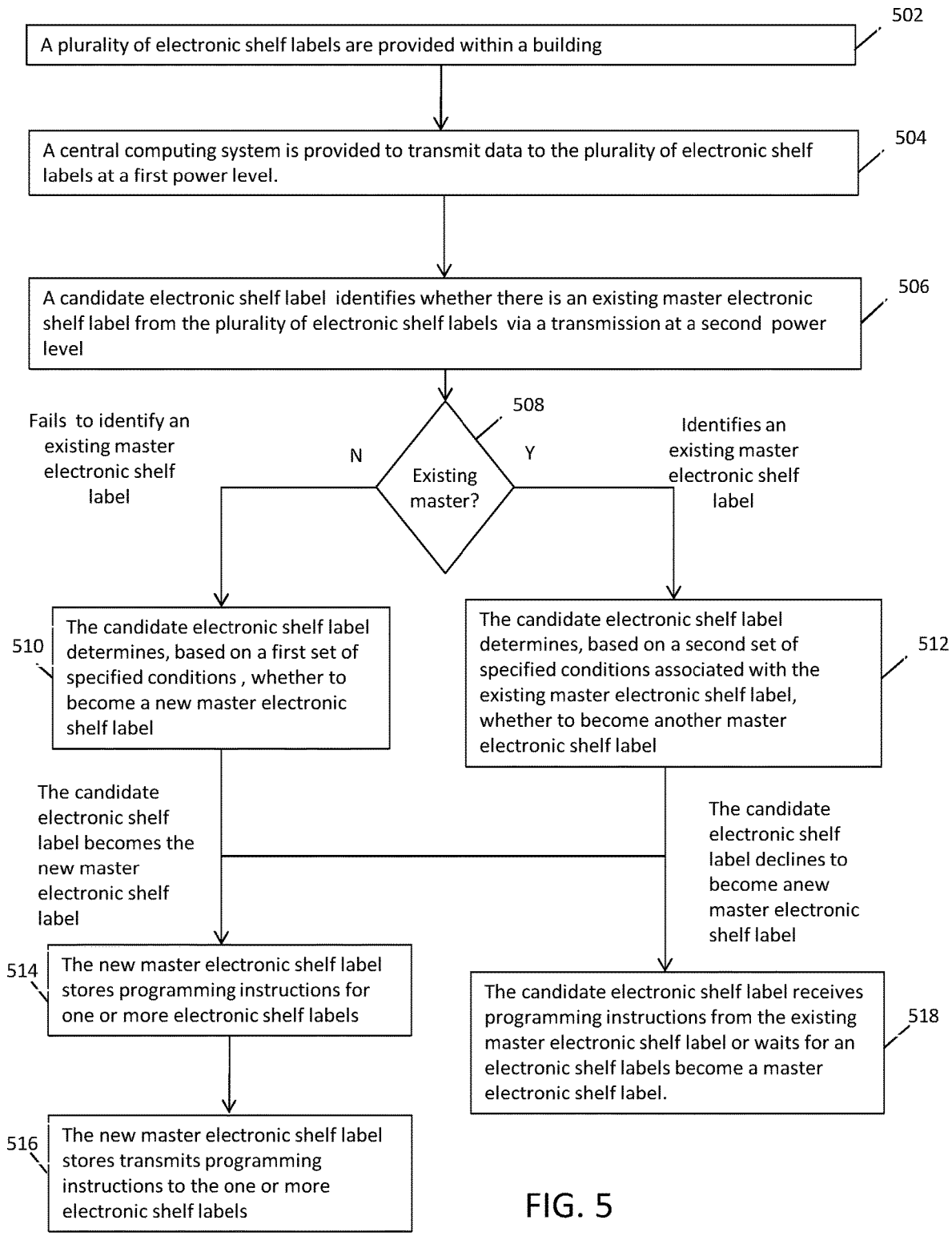
FIG. 5 is a flowchart illustrating an exemplary method of an electronic shelf label system for communication between the central computing system and a plurality of electronic shelf labels using a master electronic shelf label.

FIG. 5 is a flowchart illustrating an exemplary method 500 of an electronic shelf label system for communication between the central computing system 104 and a plurality of electronic shelf labels 102 using a master electronic shelf label 302. The electronic shelf label system includes a central computing system 104 and a plurality of electronic shelf labels 102. At step 502, the plurality of electronic shelf labels 102 are provided within a building. Each electronic shelf label including a processor, and one or more radiofrequency communication modules configured to transmit data at different power levels to control a range of communication of the one or more radiofrequency communication modules. At step 504, the central computing system is provided to transmit data transmissions via one or more wireless (e.g., Wi-Fi) access points to the plurality of electronic shelf labels at a first power level.

At step 506, a candidate electronic shelf label from the electronic shelf labels is configured to periodically activate from a sleep mode to identify whether there is an existing master electronic shelf label from the plurality of electronic shelf labels via a transmission by the one or more communication modules at a second power level.

At step 508, the candidate electronic shelf label determines whether a master electronic shelf label exists. At step 510, in response to failing to identify an existing master electronic shelf label based on the transmission, the candidate electronic shelf label determines, based on a first set of specified conditions associated with the candidate electronic shelf label, whether to become a new master electronic shelf label to transmit programming instructions received from the central computing system to the one or more electronic shelf labels at the first power level or to transmit status data received from the one or more electronic shelf labels to the central computing system via the one more wireless access points at the second power level.

Conversely, at step 512, in response to identifying the existing master electronic shelf label, the candidate electronic shelf label determines, based on a second set of specified conditions associated with the existing master electronic shelf label, whether to become another master electronic shelf label to transmit the programming instructions received from the central computing system to the one or more electronic shelf labels at the first power level or to transmit status data received from the one or more electronic shelf labels to the central computing system via the one more Wi-Fi access points at a second power level.

At step 514, in response to the candidate electronic shelf label becoming the new master electronic shelf label, the new master electronic shelf label stores the programming instructions for the one or more electronic shelf labels received from central computing system, the programming instructions including unique identifiers to associate the programming instructions with corresponding ones of the one or more electronic shelf labels. At step 516, the new master electronic shelf label transmits the programming instructions to the corresponding ones of the one or more electronic shelf labels.

Conversely, at step 518, in response to the candidate electronic shelf label declining to become the new master electronic shelf label or the additional master electronic shelf label based on the first set of specified conditions or the second set of specified conditions, the candidate electronic shelf label receives programming instructions from the existing master electronic shelf label or waiting, by the candidate electronic shelf label, for one of the one or more electronic shelf labels within range of the candidate electronic shelf label transmitting at the first power level to become the existing master electronic shelf label.

The description herein is presented to enable any person skilled in the art to create and use a computer system configuration and related method and systems for improving access to electronic data. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component, or step. Likewise, a single element, component, or step can be replaced with a plurality of elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions, and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. An electronic shelf label system comprising:
    a plurality of electronic shelf labels, each electronic shelf label including one or more radiofrequency communication modules configured to transmit data at different power levels to control a range of communication;
    a central computing system configured to transmit data to the plurality of electronic shelf labels;
    a candidate electronic shelf label from the plurality of electronic shelf labels, the candidate electronic shelf label configured to:
        periodically activate from a sleep mode to identify whether there is an existing master electronic shelf label from the plurality of electronic shelf labels;
        in response to failing to identify an existing master electronic shelf label, determine whether to become a new master electronic shelf label to transmit programming instructions received from the central computing system to one or more electronic shelf labels at a first power level; and in response to identifying the existing master electronic shelf label, determine whether to become another master electronic shelf label to transmit the programming instructions received from the central computing system to the one or more electronic shelf labels at the first power level.

2. The system of claim 1, wherein, in response to the candidate electronic shelf label becoming the new master electronic shelf label, the candidate electronic shelf label is configured to:

store the programming instructions for the one or more electronic shelf labels received from central computing system, the programming instructions including unique identifiers to associate the programming instructions with corresponding ones of the one or more electronic shelf labels; and transmit the programming instructions to the corresponding ones of the one or more electronic shelf labels.

3. The system of claim 2, wherein the candidate electronic shelf label, as the new master electronic shelf label, is further configured to receive programming instructions for the candidate electronic shelf label.

4. The system of claim 2, wherein, in response to the candidate electronic shelf label, as the new master electronic shelf label, determining to deactivate, the candidate electronic shelf label transmits a broadcast message to identify one of the one or more of the electronic shelf labels to replace the candidate electronic shelf label as the new master electronic shelf label, and wherein, in response to the candidate electronic shelf label identifying the one of the one or more of the electronic shelf labels to replace the candidate electronic shelf label as the new master electronic shelf label, the candidate transmits the programming instructions to the one of the one or more of the electronic shelf labels and deletes the programming instructions from memory.

5. The system of claim 1, wherein the candidate electronic shelf label is further configured to:

decline to become the new master electronic shelf label or the additional master electronic shelf label based on the first set of specified conditions or the second set of specified conditions; and receive programming instructions from the existing master electronic shelf label or wait for one of the one or more electronic shelf labels within range of the candidate electronic shelf label transmitting at the second power level to become the existing master electronic shelf label.

6. The system of claim 1, wherein the first set of specified conditions includes whether battery power for the candidate electronic shelf label is above a threshold battery power.

7. The system of claim 1, wherein the second set of specified conditions includes conditions associated with the existing master electronic shelf label and the candidate label, and the specified conditions include at least one of whether a received signal strength indicator level of the existing master electronic shelf label is above a threshold signal strength, whether a read rate of the existing master electronic shelf label is above a threshold read rate, or whether battery power for the candidate electronic shelf label is above the threshold battery power.

8. The system of claim 1, wherein the programming instructions change at least one of a price, texts, or lighting displayed on an electronic shelf label.

9. The system of claim 1, wherein the one or more communication modules are configured to transmit data using at least one of low level wireless fidelity (Wi-Fi), Bluetooth, or radio-frequency identification (RFID) capabilities.

10. The system of claim 1, wherein the candidate electronic shelf label is further configured to enter a sleep mode after remaining activated for a configurable amount of time.

11. A method for providing an electronic shelf label system comprising:

providing a plurality of electronic shelf labels, each electronic shelf label including one or more radiofrequency communication modules configured to transmit data at different power levels to control a range of communication;

providing a central computing system configured to transmit data to the plurality of electronic shelf labels;

periodically activating a candidate electronic shelf label from the plurality of electronic shelf labels from a sleep mode;

identifying, by the candidate electronic shelf label, whether there is an existing master electronic shelf label from the plurality of electronic shelf labels;

in response to failing to identify an existing master electronic shelf label, determining, by the candidate electronic shelf label, whether to become a new master electronic shelf label to transmit programming instructions received from the central computing system to one or more electronic shelf labels at a first power level; and in response to identifying the existing master electronic shelf label, determining, by the candidate electronic shelf label, whether to become another master electronic shelf label to transmit the programming instructions received from the central computing system to the one or more electronic shelf labels at the first power level.

12. The method of claim 11, wherein, in response to the candidate electronic shelf label becoming the new master electronic shelf label, the candidate electronic shelf label is configured to:

storing, by the candidate electronic shelf label, the programming instructions for the one or more electronic shelf labels received from central computing system, the programming instructions including unique identifiers to associate the programming instructions with corresponding ones of the one or more electronic shelf labels; and transmitting, by the candidate electronic shelf label, the programming instructions to the corresponding ones of the one or more electronic shelf labels.

13. The method of claim 12, further comprising receiving, by the candidate electronic shelf label as the new master electronic shelf label, programming instructions for the candidate electronic shelf label.

14. The method of claim 12, further comprising:

determining, by the candidate electronic shelf label as the new master electronic shelf label, to deactivate;

transmitting, by the candidate electronic shelf label, a broadcast message to identify one of the one or more of the electronic shelf labels to replace the candidate electronic shelf label as the new master electronic shelf label; and wherein, in response to the candidate electronic shelf label identifying the one of the one or more of the electronic shelf labels to replace the candidate electronic shelf label as the new master electronic shelf label, transmitting, by the candidate electronic shelf label, the programming instructions to the one of the one or more of the electronic shelf labels and deletes the programming instructions from memory.

15. The method of claim 11, further comprising:
declining, by the candidate electronic shelf label, to become the new master electronic shelf label or the additional master electronic shelf label based on the first set of specified conditions or the second set of specified conditions; and
receiving, by the candidate electronic shelf label, programming instructions from the existing master electronic shelf label or wait for one of the one or more electronic shelf labels within range of the candidate electronic shelf label transmitting at the second power level to become the existing master electronic shelf label.

16. The method of claim 11, wherein the first set of specified conditions includes whether battery power for the candidate electronic shelf label is above a threshold battery power.

17. The method of claim 11, wherein the second set of specified conditions includes conditions associated with the existing master electronic shelf label and the candidate label, and the specified conditions include at least one of whether a received signal strength indicator level of the existing master electronic shelf label is above a threshold signal strength, whether a read rate of the existing master electronic shelf label is above a threshold read rate, or whether battery power for the candidate electronic shelf label is above the threshold battery power.

18. The method of claim 11, wherein the programming instructions change at least one of a price, texts, or lighting displayed on an electronic shelf label.

19. The method of claim 11, wherein the one or more communication modules are configured to transmit data using at least one of low level wireless fidelity (Wi-Fi), Bluetooth, or radio-frequency identification (RFID) capabilities.

20. The method of claim 11, wherein the candidate electronic shelf label is further configured to enter a sleep mode after remaining activated for a configurable amount of time.

* * * * *